July 7, 1970  R. N. FARNAM  3,518,879
APPARATUS FOR TESTING COATINGS
Filed March 27, 1968  2 Sheets-Sheet 1

INVENTOR:
RONALD N. FARNAM
BY: Paul M. Denk
ATTORNEY

July 7, 1970  R. N. FARNAM  3,518,879
APPARATUS FOR TESTING COATINGS
Filed March 27, 1968  2 Sheets-Sheet 2

INVENTOR:
RONALD N. FARNAM
BY: Paul N. Denk
ATTORNEY,

United States Patent Office 3,518,879
Patented July 7, 1970

3,518,879
APPARATUS FOR TESTING COATINGS
Ronald N. Farnam, Arnold, Mo., assignor to Superior Plastics and Coatings Company, St. Louis, Mo., a corporation of Missouri
Filed Mar. 27, 1968, Ser. No. 716,575
Int. Cl. G01b 19/08
U.S. Cl. 73—150                                    2 Claims

ABSTRACT OF THE DISCLOSURE

An apparatus for testing coatings, and in particular, coatings such as paints, varnishes, resins, plastics, and the like, that are used in preserving surfaces of materials subject to deterioration. The apparatus is formed as a plate having a surface which may be intentionally subjected to imperfective action to simulate inferior conditions, and joining with said surface may be various projecting parts. This apparatus is coated and exposed to various degrees of the elements and atmospheric conditions to determine the rate of deterioration of the tested coating. A framework is provided for mounting the apparatuses. The device to mount the apparatus to the framework is constructed of electrically insulated material.

BACKGROUND OF THE INVENTION

This invention relates generally to an apparatus and supporting rack which are useful for exposing various types of coatings, as for example, paints and varnishes, to divers forms of atmospheric conditions which normally induce deterioration of such coatings.

Heretofore, various designs for testing devices have been provided that are useful for determining the strength of preservatives, such as paints, and said devices generally functioned to produce test information through a process of scribing, or periodically scratching, a painted surface for determining the resistance of the paint under such conditions. Determining the ability of the coating to resist deterioration under these artificially produced conditions may provide some statistical information which may be evaluated for determining the likelihood of the tested coating to resist deterioration, but it cannot be certain that the information acquired, or the conclusions derived from the test results, actually coincide with the genuine ability of the particular coating to resist deterioration under authentic conditions. More specifically, testing the effectiveness of a coating by use of mechanical scribing means does not truly indicate how well the coating may react when actually exposed to the elements, such as, sun, rain, snow, heat, cold, or the like. Essentially, it appears that the only natural testing that has thus far been conducted of a coating, such as paint or the like, has been performed by actually applying the coating for use upon a structure desired to be painted, and simply observe how the paint reacts over its effective life.

One of the objects of this invention is to provide an apparatus which may be coated with any form of a preserving composition and exposed to a variety of atmospheric conditions for determining the effective and useful life of the composition.

It is another object of this invention to provide an apparatus which may be subjected to various physical imperfections, such as grinding marks, pits, hammer marks, spot welds, or the like, prior to its coating with a protective composition such as paint, for determining how well the paint may preserve the apparatus, as if metallic, from corrosion.

It is a further object of this invention to provide an apparatus formed to various designs, for the purpose of determining how well a coating applied to said apparatus will preserve the same.

It is an additional object of this invention to provide one or more apparatuses including a supporting rack for use in analyzing the effectiveness of coatings in resisting deterioration under natural conditions.

It is yet a further object of this invention to provide an apparatus for testing coatings, said apparatus being insulated from electrostatic charge, and providing test results achieved through exposure of the apparatus and its coating only to the natural atmospheric conditions.

Another object of this invention is to provide a testing assembly, including the test apparatus and a supporting rack, which are simple to manufacture, and effective in usage.

Other objects will become apparent to those skilled in the art in the light of the following description and accompanying drawings.

SUMMARY OF THE INVENTION

In general, this invention provides an improved apparatus for testing and determining the effectiveness of various coatings, particularly coatings for metallic surfaces. Various coatings, such as paint, are universally employed for providing a protective cover to innumerable objects and structures, and frequently it has not been determined just how well a particular coating may react upon a coated surface. For example, it is readily apparent that various structures such as buildings or bridges constructed of structural steel contain many imperfections either inherently within the steelwork used in the constructions, or in the method of assembling or joining the various fabricated steel parts into a finished structure. To elucidate the foregoing, the fabricated steel used in the particular structure may contain many grind marks, pitted portions, hammer or other tool marks, and the like, or when the structural steel parts are joined together they may be connected by means of any form of a weld, rivet, or other connecting device. Just how well the particular coating or paint applied upon the completed structure may function to resist deterioration of the imperfect steel or joining means has usually not been determined, and it is significant that in most instances, the earliest signs of deterioration usually become evident at those portions of the completed structure where the foregoing imperfections are present, or at the joints. For these and the foregoing reasons, this invention is useful for determining how well a particular coating may react when used upon products or structures containing some imperfections, and when the coating is then exposed to natural atmospheric conditions, regardless whether they be of the pleasant or adverse type.

The invention is basically composed of two separate portions, the first part comprising the apparatus, itself, which receives the coating material to be tested, with the remaining portion comprising the rack which is useful for holding one or more of the test apparatuses during the experiment.

The device which receives the coating material during the test is formed as a plate-like member, being constructed of metal, wood, or the like, and which includes on one of its sides a surface area whereon imperfections normally found on such materials may be imposed. Noticeable surface defects such as grind marks, pits, hammer marks, slag and weld splatter are normally found on structural materials such as fabricated steel parts, and it is the effectiveness of the particular coating utilized upon these parts to resist further deterioration proximate the area of these imperfections which determines how well the coating may act as a deterrent to corrosion of the entire structure. For the purpose of evaluating how well the tested coating acts as a protection to a joint, such as where two structural steel parts may be connected, the testing device further includes a projecting part which extends from the plate-like member, and this part may be of any design, such as a length of channel, V-trough, or cylindrical member, and which may be welded or mounted by any means to the plate. The method of connecting the projecting part to the plate, as in many structures, may not necessarily be an ideal connection, since it is desirable to test the particular coating upon what may be considered as examples of adverse materials or structures. For this reason, the connecting of the projecting part to the plate may be made as an inferior weld, which may leave crevices or other undesirable spacings intermediate the two members. When the test apparatus is constructed in this manner, it may be determined just how well the coating material may permeate and provide a protective cover at these inferior areas.

To acquire test results from the use of a paint that has been exposed solely to various atmospheric conditions, the invention contemplates the insulation of the test apparatus from the rack upon which it rests. To achieve such, mounts formed of electrically insulated material connect with the plate-like member, and these mounts engage within the aforesaid rack, thereby holding the apparatus firmly in place. Without usage of some form of insulated mounts, it is highly probable that electrostatic charge may permeate both the rack and the test apparatus, having some significant effect upon the coating applied to the device and its functioning as a corrosion deterrent. That this electrostatic charge may be of advantage or disadvantage to the functioning of the coating upon the test device is not of significance, since under normal conditions of use, as when the coating may be applied to a building, bridge, or other structure, such electrostatic charge probably will not be present.

Having summarized the invention and expressed some of the advantages to be achieved therefrom, its operation may be more thoroughly understood from a detailed description of its preferred embodiment.

DESCRIPTION OF THE PREFERRED EMBODIMENT

Figure 1:
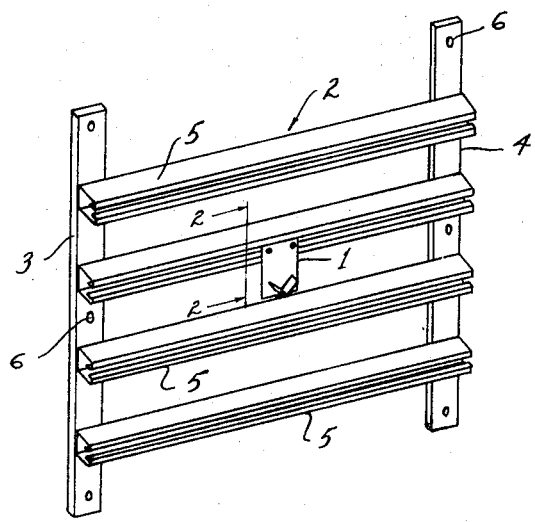
FIG. 1 is a perspective view of a test apparatus shown mounted upon its supporting rack.

Referring now to the drawing for one illustrative embodiment of the test apparatus and supporting rack of this invention, in FIG. 1, reference numeral 1 generally indicates the testing apparatus as mounted in operative position upon the rack 2. The rack is formed having a pair of lateral support members 3 and 4, and arranged transversely between said support members are a series of channels 5. In this particular embodiment, the channels are shown connecting proximate their ends to each support member, and therein form a structurally stable arrangement useful for holding one or more of the apparatuses 1 when employed for the purposes of this invention. The support members 3 and 4 are shown having a plurality of apertures, as at 6, which are conveniently located for facilitating the mounting of the rack to any supporting structure, such as a wall (not shown).

Figure 2:
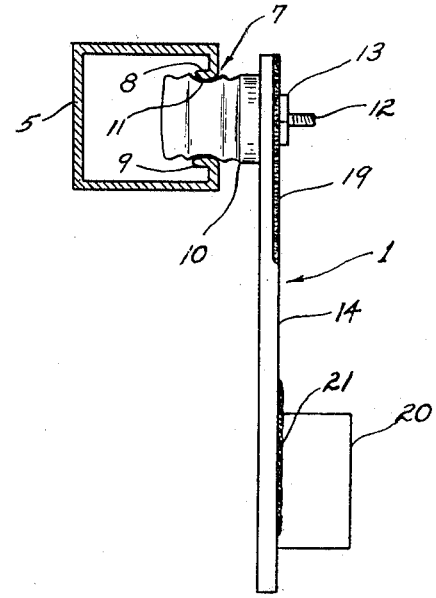
FIG. 2 is a side view of the apparatus, and a support channel, taken along the line 2—2 of FIG. 1.

By referring also to FIG. 2, the method for mounting of each test apparatus 1 to a cooperating channel 5 is shown. Each channel 5 is formed as a structural member having closed sides, and an open side, as at 7, provided along its entire length. Provided integrally along each marginal edge of the open side 7 are the turned-in flanges 8, 9 which are useful in providing enhanced support for retention of the mounts 10 that attach to each apparatus. The mounts 10 are preferably formed of electrically insulating material, such as any form of ceramic, porcelain, or the like, and are shaped having an arcuate recess 11, around its perimetrical surface. This recess is useful for providing a snug insertion of the mounts intermediate the flanges 8, 9 of the channel, thereby insuring a firm retention of the test apparatus stably in place. The insulated mounts 10 are rigidly secured to their respective apparatus by means of a bolt 12 formed integrally within each insulated mount, each being held in place by means of a nut 13. Usage of the insulated mounts 10 as a means for retaining the testing apparatus to the channels 5 of the rack ensure that each apparatus will be free from any static charge that may be present in the rack.

Each test apparatus 1, by referring to FIGS. 1 thru 4, is constructed having a plate-like member 14, having a forwardly directed surface to which the coating to be tested may be freely and easily applied. The surface area 15 provided in the upper section of the plate furnishes ample amount of space upon which various of material defects and physical imperfections may be made, especially when it is desired to determine how well a particular coating may protect areas possessing such impairments. For example, as shown, the exposed surface area 15 of this plate member has been subjected to grind marks 16, hammer marks 17, the series of pits 18, and along one edge a marginal grind 19 has been made. Thus, any coating applied to the plate 14 must necessarily cover the aforesaid defects, and a determination may be readily made upon visual observation as to how well the tested coating protects these areas.

Provided in the lower section of the plate-like member 14 is a projecting part, such as the troughed member 20 as shown, and in this manner the attributes of the tested coating for preserving the joint between two particular members may be readily observed. The projecting part 20 may connect with the plate member by any means of attachment desired, but the connection herein used is disclosed as a series of welds 21. It is to be noted that the projecting part 20 does not necessarily adhere flush to the surface area of the plate 14, but rather there may be purposely provided some crevices or other spacings, such as shown at 22, where it may be determined how well the coating being tested protects this condition. In addition, the upward extension of the joining weld, as at 23, and the patches of splatter slag and weld 24, may likewise provide an indication as to how well the coating material may protect a weld from oxidation. Additionally, since the projecting part 20 is formed in the shape of a trough, just how well the coating may protect the area proximate its angular convergence when the elements such as water or rain may accumulate therein can also be determined.

Figure 4:
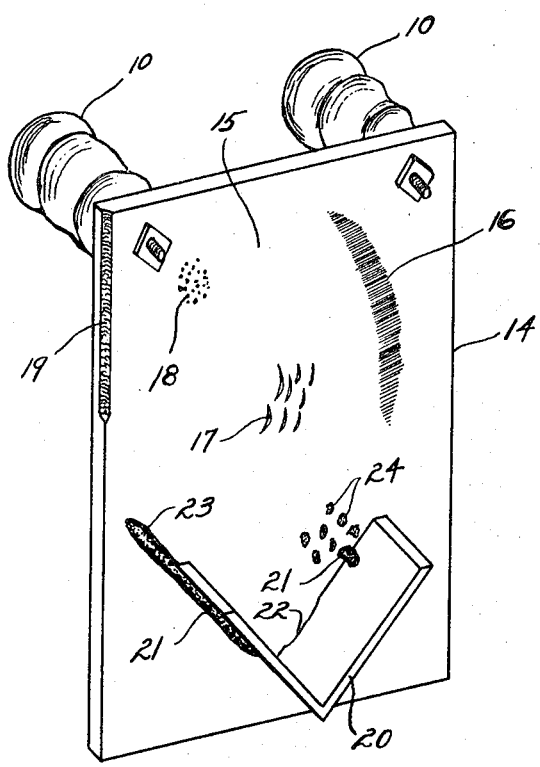
FIG. 4 is an enlarged perspective view of the test apparatus, showing the insulated mounts and projecting part connecting thereto.

It should be stated that the testing device, as disclosed in FIG. 4, may be formed and constructed of any type of material upon which it is desired to determine the protection provided by a coating, and if the material be a metal, it may yet be further treated such as by sand blasting prior to the coating process to achieve even more varied test results. The apparatus as shown reveals a pair of insulated mounts 10 connecting with the rearward portion of the plate-like member 14, and it can be readily observed that usage of a pair or more of said mounts increases the stabilization of the device when held by the rack.

Figure 5:
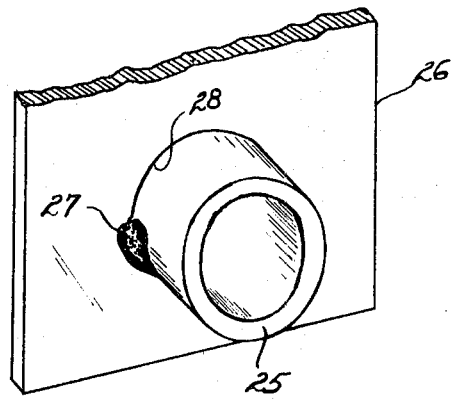
FIG. 5 is a perspective partial view of the test apparatus, and showing a modification in the projecting part.
Figure 3:
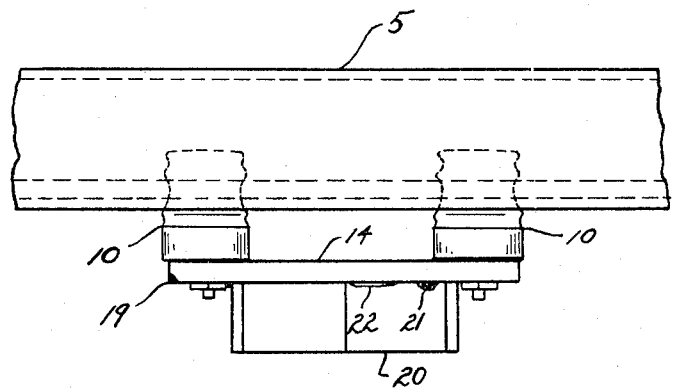
FIG. 3 is a top view of the test apparatus shown in FIG. 2.
Figure 6:
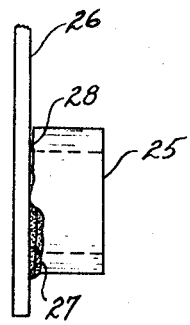
FIG. 6 is a side view of the part of the test apparatus shown in FIG. 5.
Figure 7:
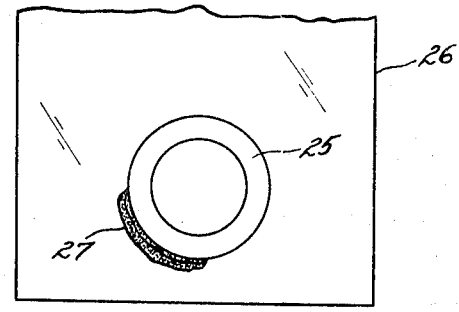
FIG. 7 is a front view of the part of the test apparatus shown in FIG. 5.

The shape or design of the projecting part of the testing device may be of any configuration, and as shown in FIGS. 5 through 7, the projecting part 25 is herein shown as a length of cylindrical member extending from the plate-like member 26 of the test apparatus. Under this arrangement, the ability of the coating to adhere to contoured surfaces while simultaneously being exposed to the elements may be readily determined. The projecting part 25 is herein shown connecting with the plate member by means of a partial circumferential weld 27, and as previously described, there may be a slight crevice, as at 28, provided intermediate the projecting part and plate which may further provide an indication of how well the coating material may protect an imperfect joining area between two structural parts from the action of corrosion.

Thus, the foregoing description of the various embodiments of this invention depict a test apparatus for use in analyzing how well coatings, such as paint, may protect various materials, including inferior or defective grades of materials, under almost natural conditions. It can be readily seen that numerous variations in the construction of the apparatus of this invention, will occur to those skilled in the art in light of the foregoing disclosure. Although such variations may not be precisely described or defined within the description of this preferred embodiment, such variations are intended to be encompassed within the scope of any patent protection that may issue hereupon.

Having thus described the invention, what is claimed and desired to be secured by Letters Patent is:

1. An apparatus for testing coatings comprising a plate-like member being substantially planar in formation and providing a surface area on at least one of its sides, a projecting part extending from said plate, means connecting said projecting part to the plate-like member, said projecting part and surface area of the plate being disposed for reception of a coating for determining its effectiveness in resisting deterioration, means for mounting said apparatus, and said mounting means being formed of electrically insulated material.

2. An apparatus for testing coatings comprising a plate-like member being substantially planar in formation and providing a surface area on at least one of its sides, a projecting part extending from said plate, means connecting said projecting part to the plate-like member, said projecting part and surface area of the plate being disposed for reception of a coating for determining its effectiveness in resisting deterioration, a rack for holding the apparatus, a pair of support members provided at the sides of the rack, a series of channels arranged transversely and connecting to each support member, said channels having their open side disposed for reception and retention of the apparatus, mounting means connecting with the test apparatus for insertion within the channel for holding said apparatus in fixed relationship thereto, and said mounting means being of electrically insulated material.

References Cited

UNITED STATES PATENTS

| | | |
|---|---|---|
| 1,811,765 | 6/1931 | Snelling. |
| 2,020,891 | 11/1935 | Hoover et al. _____ 73—150 |
| 2,688,356 | 9/1954 | Conti _____ 73—150 XR |
| 2,712,235 | 7/1955 | Harlan _____ 73—150 |
| 3,065,334 | 11/1962 | Hillenbrand et al. |
| | | 312—349 XR |

OTHER REFERENCES

Circular: "Varnish Studies," W. T. Pearce, Scientific Section of the Paint Manufacturers' Association of the U.S., 1924, 10 pages.

LOUIS R. PRINCE, Primary Examiner

H. C. POST III, Assistant Examiner